United States Patent [19]

Carpenter et al.

[11] Patent Number: 5,789,352

[45] Date of Patent: Aug. 4, 1998

[54] WELL COMPLETION SPACER FLUIDS AND METHODS

[75] Inventors: Robert B. Carpenter, Allen, Tex.; J. Michael Wilson; Bill W. Loughridge, both of Duncan, Okla.; David L. Johnson, Dallas, Tex.; Krishna M. Ravi, Duncan, Okla.; Richard R. Jones, Allen, Tex.

[73] Assignees: Halliburton Company, Duncan, Okla.; Atlantic Richfield Company, Plano, Tex.

[21] Appl. No.: 666,782

[22] Filed: Jun. 19, 1996

[51] Int. Cl.$^6$ .............. E21B 43/00; E21B 21/00; C09K 7/02

[52] U.S. Cl. .......... 507/209; 507/211; 507/213; 507/216; 507/225; 507/226; 507/228; 507/229; 507/262; 507/928; 166/291

[58] Field of Search ............... 507/228, 211, 507/216, 225, 226, 229, 262, 928, 213; 166/291

[56] References Cited

U.S. PATENT DOCUMENTS

| | | | |
|---|---|---|---|
| 4,083,407 | 4/1978 | Griffin, Jr. et al. | 166/291 |
| 4,217,229 | 8/1980 | Watson | 252/8.55 R |
| 4,276,182 | 6/1981 | Beirute | 252/8.55 R |
| 4,342,866 | 8/1982 | Kang et al. | 536/119 |
| 4,423,781 | 1/1984 | Thomas | 166/312 |
| 4,717,488 | 1/1988 | Seheult et al. | 252/8.551 |
| 4,888,120 | 12/1989 | Mueller et al. | 252/8.551 |
| 4,892,898 | 1/1990 | Leighton et al. | 524/3 |
| 5,030,366 | 7/1991 | Wilson et al. | 252/8.551 |
| 5,038,863 | 8/1991 | Bloys et al. | 166/291 |
| 5,101,902 | 4/1992 | Parcevaux et al. | 166/291 |
| 5,113,943 | 5/1992 | Wilson et al. | 166/291 |
| 5,316,083 | 5/1994 | Nahm et al. | 166/291 |
| 5,332,041 | 7/1994 | Onan et al. | 166/295 |
| 5,458,197 | 10/1995 | Chan | 166/304 |

FOREIGN PATENT DOCUMENTS

| | | |
|---|---|---|
| 0 171 999 A2 | 2/1986 | European Pat. Off. |
| 0 430 644 A1 | 6/1991 | European Pat. Off. |
| 2 077 817 | 12/1981 | United Kingdom |

OTHER PUBLICATIONS

Paper entitled "Development of a Unique Low Solids, High Density Drilling Fluid System" presented at the Drilling Fluids Technology Conference held in Houston, TX, Apr. 3rd & 4th, 1996.

*Primary Examiner*—Shean C. Wu
*Attorney, Agent, or Firm*—Craig W. Roddy; C. Clark Dougherty, Jr.

[57] ABSTRACT

A well completion spacer fluid is provided which is particularly suitable for separating a cement slurry from drilling fluid in primary cementing operations. The well completion spacer fluid is also useful for separating other potentially incompatible fluids in the wellbore, such as, separating drilling fluid from a completion brine. The spacer fluid basically comprises water, a hydrous magnesium silicate clay, silica and organic polymer(s).

22 Claims, No Drawings

WELL COMPLETION SPACER FLUIDS AND METHODS

BACKGROUND OF THE INVENTION

1. Field of the Invention

The present invention relates to spacer fluids and methods useful in performing well completions such as primary cementing.

2. Description of the Prior Art

In the mechanics of drilling a well bore with a rotary drill bit, weight is applied to a string of drill pipe while the drill bit is rotated. A drilling fluid, often referred to as drilling mud or mud, is circulated through the string of drill pipe, through the drill bit and upwardly to the surface through the annulus formed between the drill pipe and the surface of the well bore. The drilling fluid cools the drill bit, removes cuttings from the well bore and maintains hydrostatic pressure on pressurized subterranean formations. The over-balance of pressure from the well bore to the subterranean formations prevents potentially dangerous movement of fluid and gas from the formations into the well bore. The over-balance also promotes partial dehydration of the drilling fluid. As the drilling fluid dehydrates or loses filtrate to the formation, the fluid remaining in the annulus gels or increases in viscosity and a layer of solids and gelled drilling fluid known as filter cake is deposited against the formation face. Both the increase in viscosity of the drilling fluid and deposit of filter cake are detrimental to obtaining effective drilling fluid displacement and removal from the walls of the well bore and a subsequent competent bond between casing, primary cement and the walls of the well bore.

In primary well cementing operations, a cement slurry is pumped into the annulus between a string of casing or other pipe disposed in the well bore and the walls of the well bore for the intended purpose of sealing the annulus, supporting the casing or pipe and protecting the casing or pipe from corrosive elements in the well bore. Incomplete displacement of the drilling fluid often prevents the formation of an adequate bond between the cement, the casing or pipe and the well bore.

The removal of gelled drilling fluid and filter cake is further complicated if the casing or other pipe to be cemented in a well bore is not centered in the well bore. The resulting eccentric annulus promotes fluid flow through the wide side of the annulus as a result of resistance to flow being less therein. Since a cement slurry does not flow as readily through the narrow side of the annulus, all of the drilling fluid in the annulus may not be displaced by the slurry. Deviated well bores can generally be characterized as having eccentric annuli due to the difficulty in properly centralizing the casing or pipe prior to cementing.

Spacer fluids are often used in oil and gas wells to facilitate improved displacement efficiency when pumping new fluids into the well bore. The spacer fluids are typically placed between one or more fluids contained within or to be pumped within the well bore. Examples include placing spacer fluids between a hydraulic cement slurry and a drilling fluid, between different drilling fluids during drilling fluid change outs or between a drilling fluid and a completion brine. Spacers are also used to enhance solids removal during drilling operations, to enhance displacement efficiency and to physically separate chemically incompatible fluids.

As various fluids are pumped into the well bore, it is necessary to make sure that they do not adversely affect the properties of each other, e.g., increase in viscosity. Such effects are referred to as incompatibility. In cementing operations, the cement slurry may be incompatible with the drilling fluid. In primary cementing, the cement slurry is separated from the drilling fluid and partially dehydrated gelled drilling fluid is removed from the walls of the well bore by a spacer fluid pumped between the drilling fluid and the cement slurry. Ideally, the spacer fluid prevents intermixing of the two incompatible fluids and affords increased compatibility between the incompatible fluids should they intermix.

Most spacer fluids have heretofore been comprised of a base aqueous fluid, a viscosity and fluid loss control additive, weighting material agent and a surfactant. The weighting material is included in the spacer fluid to increase its density for well control and increases the buoyancy effect of the spacer fluid on the gelled drilling fluid and filter cake adhered to the walls of the well bore. Viscosity additives are intended to produce Theological properties which provide suspended particle stability and fluid loss control to the spacer fluid. When a surfactant is included in the spacer fluid, it is intended to enhance the chemical compatibility of the spacer fluid with the other fluids and to water-wet down hole surfaces for an improved cement bond and better removal of well bore solids.

While heretofore used spacer fluids have achieved varying degrees of success, there is a continuing need for more effective spacer fluids. That is, there is a need for spacer fluids that maintain uniform fluid velocity profiles across well bore annuli as the fluids are being pumped through the annuli. This becomes particularly important in cases where the pipe or casing is eccentrically located within the well bore. In order to maintain a uniform fluid velocity profile in the resulting eccentric annulus, the spacer fluid must be pseudo-plastic and the rheology profile on a viscometer should be such that the shear stress remains very near the same over a large shear rate range.

SUMMARY OF THE INVENTION

The present invention provides improved well completion spacer fluids and methods which meet the needs described above and overcome the shortcomings of the prior art. The spacer fluids have good compatibility with drilling fluids and well treating fluids such as cement slurries, have good particle transport properties and have near constant shear stress profiles.

Spacer fluids developed in the past have suffered from temperature thinning and also incompatibility with other treating fluids. This has been overcome in the spacer fluid of this invention by utilizing a temperature resistant viscosifier comprised of magnesium silicate clay and silica. The yield of these materials is not dramatically affected by increased pH or the presence of divalent cations or halides, which improves the fluid's intrinsic capability with cement slurries. Thus, less dispersant is required for optimum fluid capability and provides a great economic advantage.

The spacer fluids of this invention are basically comprised of water, a hydrous magnesium silicate clay, silica and organic polymer(s). The hydrous magnesium silicate clay is preferably selected from the group consisting of sepiolite and attapulgite, the silica is fumed silica or colloidal silica and the organic polymer(s) is preferably selected from the group consisting of welan gum, xanthan gum, galactomannan gums, succinoglycan gums, scleroglucan gums, and cellulose and its derivatives.

Dry mix compositions are also provided for forming the aqueous spacer fluids by mixing with water. The dry mix compositions are comprised of mixtures of the hydrous magnesium silicate clay, silica and organic polymer(s). Most preferably, the dry mix aqueous spacer fluid compositions are comprised of sepiolite, fumed silica, welan gum and hydroxyethylcellulose (HEC).

In accordance with the methods of the invention, a spacer fluid of the invention is utilized to displace a first fluid, e.g., drilling fluid, with an incompatible second fluid, e.g., a cement slurry, in a well. The spacer fluid functions to separate the first fluid from the second fluid and to remove the first fluid from the walls of the well. In drilling and completion operations, the purpose of the spacer fluid is to suspend and remove partially dehydrated/gelled drilling fluid and drill cuttings from the well bore and allow a second fluid, e.g., completion brine, to be placed in the well bore.

It is, therefore, a principal object of the present invention to provide improved spacer fluids and methods.

A further object of the present invention is the provision of dry mix compositions for forming aqueous spacer fluids.

Other and further objects, features and advantages of the present invention will be readily apparent to those skilled in the art upon a reading of the description of preferred embodiments which follows.

DESCRIPTION OF PREFERRED EMBODIMENTS

As mentioned, spacer fluids are commonly utilized in oil field applications. Generally, such spacer fluids are used between a first fluid which is to be displaced by an incompatible second fluid in the well. The spacer fluid separates the first and second fluids thereby preventing mixing of the fluids and the adverse reactions which may take place as a result of such mixing.

In well cementing operations such as primary cementing, a cement slurry is pumped into the annulus between a string of casing disposed in the well bore and the walls of the well bore for the intended purpose of sealing the annulus to the flow of fluids through the well bore, supporting the casing and protecting the casing from corrosive elements in the well bore. The drilling fluid present in the annulus partially dehydrates and gels as it loses filtrate to the formation. The presence of this partially dehydrated/gelled drilling fluid in the annulus is detrimental to obtaining an adequate cement bond between the casing and the well bore. As the casing becomes more eccentric, the removal process becomes more difficult.

In order to separate the cement slurry from the drilling fluid and remove partially dehydrated/gelled drilling fluid from the walls of the well bore ahead of the cement slurry as it is pumped, a spacer fluid is inserted between the drilling fluid and the cement slurry. The spacer fluid prevents contact between the cement slurry and drilling fluid and it is intended to possess rheological properties which bring about the removal of partially dehydrated/gelled drilling fluid from the well bore. However, virtually all elements of the downhole environment work against this end. Fluid loss from the drilling fluid produces localized pockets of high viscosity fluid. At any given shear rate (short of turbulent flow) the less viscous spacer fluid will tend to channel or finger through the more viscous drilling fluid. At low shear rates, the apparent viscosity of most cement and spacer fluids is lower than that of the high viscosity drilling fluid in localized pockets. To overcome this, the cement and spacer fluids are pumped at higher rates so that the fluids are at higher shear rates and generally have greater apparent viscosities than the drilling fluid. Drag forces produced by the drilling fluid upon filter cake are also increased. Unfortunately, the pump rates that are practical or available are not always sufficient to effectively displace and remove drilling fluid from the well bore prior to primary cementing.

Displacement of the drilling fluid is hindered by the fact that the pipe is generally poorly centered causing an eccentric annulus. In an eccentric annulus, the displacing spacer fluid tends to take the path of least resistance. It travels or channels through the wide side of the eccentric annulus where the overall shear level is lower. Since the cement and spacer fluid travel faster up the wide side of the annulus, complete cement coverage may not result before completion of the pumping of a fixed volume. Also, since the flow path will generally spiral around the pipe, drilling fluid pockets are often formed.

The displacement of drilling fluid from well bore washouts is also a problem. When the velocity (shear rate) and relative shear stress of the cement and spacer fluid are lowered due to encountering an enlarged well bore section, it is difficult for the spacer fluid to displace the drilling fluid. The cross-sectional area in enlarged sections of a well bore can be several orders of magnitude greater than the predominate or designed annulus. Fluid flow through those sections is at much lower shear rates and generally the annulus is also more eccentric since the well bore diameter is often outside the maximum effective range of casing centralizers.

Another problem which adversely affects drilling fluid displacement is spacer fluid thermal thinning. A high degree of thermal thinning normally limits available down hole viscosity, particularly at elevated temperatures and low shear rates. In that situation, adequate viscosity at the lower shear rates can often not be obtained because the spacer fluid at the surface would be too viscous to be mixed or pumped. Even a very viscous spacer fluid exhibits relatively little viscosity at low shear rates and elevated temperatures.

Typically, one or more of the above mentioned rheological or other factors are working against efficient drilling fluid displacement. As a result, pockets of non-displaced drilling fluid are generally left within the annulus at the end of displacement. As mentioned, high displacement rates would help many of these problems, but in most field applications pump capacity and formation fracture gradients limit the displacement rates to less than those required. Even when relatively high pump rates can be utilized, cement evaluation logs typically show a good cement sheath only in areas of good centralization and normal well bore diameter.

Another problem involves the lack of solids suspension by spacer fluids. The thermal thinning and reduced low shear rate viscosity exhibited by many spacer fluids promotes sedimentation of solids. Until a spacer fluid develops enough static gel strength to support solids, control of sedimentation is primarily a function of low shear rate viscosity. In deviated or horizontal well bores, solids support is much more difficult and at the same time more critical. The more nearly horizontal the well bore is, the shorter the distance for coalescence. As a result, high density solids can quickly build-up on the bottom of the well bore.

An ideal spacer fluid would have a flat rheology, i.e., a 300/3 ratio approaching 1. It would exhibit the same resistance to flow across a broad range of shear rates and limit thermal thinning, particularly at low shear rates. A 300/3 ratio is defined as the 300 rpm shear stress divided by the 3 rpm shear stress measured on a Chandler or Fann Model 35 rotational viscometer using a B1 bob, an R1 sleeve and a No. 1 spring. The greater the resultant slope value, the more prone the spacer fluid is to channeling in an eccentric annulus; 300/3 ratios of 2 to 6 are achieved by the spacer fluid compositions of this invention. As a result, the compositions are better suited for drilling fluid displacement than prior art spacer fluids. The spacer fluids of this invention have relatively flat rheologies and are not impacted by eccentric annuli since they exhibit nearly the same resistance to flow across the whole annulus. Most prior art spacers exhibit a 300/3 ratio of 8–10.

By the present invention, improved spacer fluids are provided which have excellent compatibility with treating fluids such as cement slurries, drilling fluids and other completion fluids. The spacer fluids also possess the ability to suspend and transport solid materials such as partially dehydrated/gelled drilling fluid and filter cake solids from the well bore. Further, the relatively flat rheology spacer fluids of this invention possess the ability to maintain nearly uniform fluid velocity profiles across the well bore annulus as the spacer fluids are pumped through the annulus, i.e., the spacer fluids are pseudo-plastic with a near constant shear stress profile.

A dry mix composition for forming an aqueous spacer fluid is provided by this invention which is basically comprised of a hydrous magnesium silicate clay, silica and an organic polymer. The hydrous magnesium silicate clay is preferably selected from the group consisting of sepiolite and attapulgite with sepiolite being preferred.

Various forms of silica can be used such as fumed silica and colloidal silica. Fumed silica is preferred for use in the dry mix composition of this invention. As will be described further, colloidal silica is preferably used in the spacer compositions which are prepared by directly mixing the individual components with water.

The organic polymer is preferably selected from the group consisting of welan gum, xanthan gum, galactomannan gums, succinoglycan gums, scleroglucan gums and cellulose and its derivatives, e.g., hydroxyethylcellulose (HEC), with a mixture of welan gum and HEC being the most preferred. For example, when a mixture of about 5.7 parts by weight welan gum and 1 part HEC is used, a synergistic rheology enhancement results. That is, a higher viscosity using less polymer results, i.e., about one-half less polymer is required to achieve the same viscosity level. The synergistic result occurs when a weight ratio of HEC to welan gum and/or xanthan gum is from about 1:1 to about 1:49. More preferably, a weight ratio range of about 1:1.5 to about 1:19 is used to achieve the synergistic rheology enhancement result. Most preferably, a weight ratio range of about 1:3 to about 1:9 is used to achieve the synergistic rheology enhancement result. Furthermore, the combination of welan gum and/or xanthan gum in combination with hydroxyethylcellulose (HEC) is useful in cements, drilling fluids, spacing fluids, well servicing fluids and the like.

The clay and silica in the compositions of this invention interact to produce an inorganic aqueous gel, and the organic polymer further enhances the rheological properties of the gel. The clay is preferably present in the dry mix composition in an amount in the range of from about 15% to about 85% by weight of the composition, the silica is preferably present in an amount in the range of from about 15% to about 85% by weight of the composition and the organic polymer is preferably present in an amount in the range of from about 0.5% to about 10% by weight of the composition.

In a preferred dry mix composition, the clay is sepiolite present in an amount of about 24% by weight of the composition, the silica is fumed silica present in an amount of about 74% by weight of the composition and the organic polymer is about a 3:1 by weight mixture of welan gum and HEC present in an amount of about 2% by weight of the composition.

Another preferred dry mix composition comprises sepiolite in an amount of about 74% by weight of the composition, fumed silica in an amount of about 24% by weight of the composition and about a 3:1 by weight mixture of welan gum and HEC in an amount of about 2% by weight of the composition.

The dry mix composition is generally added to water to form an aqueous spacer fluid in an amount in the range of from about 0.5% to about 25% by weight of the water (from about 1.0 pounds to about 82.5 pounds per barrel of spacer fluid). A more preferred range is from about 1% to about 20% by weight of water (from about 2.0 pounds to about 66 pounds per barrel of spacer fluid).

The well completion spacer fluids of this invention are basically comprised of water, a hydrous magnesium silicate clay as described above, silica and an organic polymer as described above. The aqueous spacer fluids can be formed by combining a dry mix composition as described above with water or the individual components of the spacer fluid can be individually combined with water. The water utilized can be any water which does not adversely affect the other components in the spacer fluid or components of the fluids separated by the spacer fluid. Generally, fresh water is preferred due to its having the greatest compatibility with other components and fluids.

The aqueous spacer fluid of this invention preferably includes water, hydrous magnesium silicate clay in an amount in the range of from about 0.1% to about 17% by weight of water (from about 0.2 pound to about 56 pounds per barrel of spacer fluid), silica in an amount in the range of from about 0.1% to about 17% by weight of water (from about 0.2 pounds to about 56 pounds per barrel of spacer fluid) and organic polymer in an amount in the range of from about 0.05% to about 2.5% by weight of water (from about 0.1 pounds to about 8.25 pounds per barrel of spacer fluid). Most preferably, the clay is sepiolite present in an amount in the range of from about 0.5% to about 10% by weight of water (from about 1.0 pounds to about 33 pounds per barrel of spacer fluid), the silica is fumed silica present in an amount in the range of from about 0.5% to about 10% by weight of water (from about 1.0 pounds to about 33 pounds per barrel of spacer fluid) and the organic polymer is about a 3:1 by weight mixture of welan gum and HEC present in an amount in the range of from about 0.05% to about 1.2% by weight of water (from about 0.1 pounds to about 4.0 pounds per barrel of spacer fluid). The use of fumed silica is advantageous in that it enhances the suspension of solids in the spacer fluid under static or near static conditions due to hydrogen bonding between the silica particles.

The dry mix compositions and/or the aqueous spacer fluids may also include a dispersing agent, a surfactant, and a weighting material. The dispersant improves compatibility of fluids which would otherwise be incompatible. The surfactant improves bonding and both the dispersant and surfactant aid in the removal of partially dehydrated/gelled drilling fluid. The weighting material increases the density of the spacer fluid.

Various dispersing agents can be utilized in the compositions of this invention. However, preferred dispersing agents are those selected from the group consisting of sulphonated styrene maleic anhydride copolymer, sulphonated vinyltoulene maleic anhydride copolymer, sodium naphthalene sulfonate condensed with formaldehyde, sulphonated acetone condensed with formaldehyde, lignosulphonates and interpolymers of acrylic acid, allyloxybenzene sulfonate, allyl sulfonate and non-ionic monomers. Generally, the dispersing agent is included in the dry mix composition in an amount in the range of from about 0.5% to about 50% by weight of the composition. It is included in the aqueous spacer fluid in an amount in the range of from about 0.05% to about 3% by weight of water in the aqueous spacer fluid composition (from about 0.1 pounds to about 10 pounds per barrel of spacer fluid). The dispersant can be added directly to the water if in liquid or solid form or included in the dry mix composition if in solid form.

While various water-wetting surfactants can be used in the compositions, nonylphenol ethoxylates, alcohol ethoxylates and sugar lipids are generally preferred. When used, the surfactant is included in the spacer fluid in an amount which replaces up to about 20% of the water used, i.e., an amount in the range of from about 0.1 gallon to about 10 gallons per barrel of spacer fluid when the surfactant is in the form of a 50% by weight aqueous concentrate. The surfactant is normally added directly to the water used or to the aqueous spacer fluid.

The weighting material can be any conventional weighting material which does not adversely react with other components or fluids. Generally, a weighting material selected from the group consisting of barite, hematite, manganese tetraoxide and calcium carbonate is preferred, with barite being the most preferred. The amount and type of weighting material added to the aqueous spacer fluid is that amount which produces a spacer fluid density in the range of from about 9 pounds per gallon to about 24 pounds per gallon.

Other components can advantageously be included in the spacer fluids of this invention in relatively small quantities such as salts, e.g., ammonium chloride, sodium chloride and potassium chloride.

As mentioned, the spacer fluids of this invention are pseudo-plastic fluids with near constant shear stress profiles, i.e., 300/3 ratios of from about 2 to about 6. This property of the spacer fluids of this invention is particularly important when the spacer fluids are utilized in primary cementing operations. The property allows the spacer fluids to maintain nearly uniform fluid velocity profiles across a well bore annulus as the spacer fluids followed by cement slurries are pumped into the annulus. The nearly uniform fluid velocity profile brings about a more even distribution of hydraulic force impinging on the walls of the well bore thereby enhancing the removal of partially dehydrated/gelled drilling fluid and solids from the well bore. This property of the spacer fluid is particularly important in applications where the casing being cemented is located eccentrically in the well bore (an extremely probable condition for highly deviated well bores).

In carrying out the methods of the present invention, a first fluid is displaced with an incompatible second fluid in a well bore utilizing a spacer fluid of the invention to separate the first fluid from the second fluid and to remove the first fluid from the well bore. In primary cementing applications, the spacer fluid is generally introduced into the casing or other pipe to be cemented between drilling fluid in the casing and a cement slurry. The cement slurry is pumped down the casing whereby the spacer fluid ahead of the cement slurry displaces drilling fluid from the interior of the casing and from the annulus between the exterior of the casing and the walls of the well bore. The spacer fluid prevents the cement slurry from contacting the drilling fluid and thereby prevents severe viscosification or flocculation which can completely plug the casing or the annulus. As the spacer fluid is pumped through the annulus, it aggressively removes partially dehydrated/gelled drilling fluid and filter cake solids from the well bore and maintains the removed materials in suspension whereby they are removed from the annulus. As mentioned above, in primary cementing applications, the spacer fluid preferably includes a surfactant whereby the surfaces within the annulus are water-wetted and the cement achieves a good bond to the surfaces.

In order to further illustrate the spacer fluid and methods of the present invention, the following examples are given.

EXAMPLE 1

A number of aqueous spacer fluid compositions were tested for rheology at room temperature and at 185° F. or 190° F. The compositions tested included an aqueous organic polymer (welan gum) composition; aqueous compositions of a hydrous magnesium silicate clay (sepiolite) and an organic polymer (welan gum); aqueous compositions of silica and an organic polymer (welan gum); and aqueous compositions of the present invention comprised of a hydrous, magnesium silicate clay (sepiolite) silica and an organic polymer (welan gum). All of the compositions included a dispersant, barite weighting material and a surfactant. The rheology tests were conducted in accordance with standard procedures utilizing Chandler or Fann Model 35 viscometers equipped with B1 bobs, R1 sleeves and No. 1 springs.

The compositions which were tested were prepared by first weighing tap water into an API blender cup. The clay, silica and/or polymer were then mixed into the water with 1,500 rpm stirring. The gels were then yielded by stirring at 4,000 rpm for 2 minutes. Defoaming agents were added as necessary and weighting material (barite) was added under low rpm stirring followed by the surfactant used. The slurries were mixed for an additional 2 minutes at 1,500 to 2,000 rpm. The slurries were transferred to atmospheric cement consistometers and conditioned at room temperature, a temperature of 185° F. or 190° F. for 20 minutes. The slurries were then transferred to heat controlled viscometer cups for rheology measurements made on the above mentioned viscometers. The rheology numbers and plastic viscosity are reported in units of centipoise (cp) with yield point being reported in units of pounds per 100 square feet. Both plastic viscosity and yield point are calculated values using regression analysis of the 300 rpm to 30 rpm viscometer readings. As mentioned above, the 300/3 ratio is an indication of flat rheology fluid behavior. The aqueous compositions tested are set forth in Table I below and the results of the rheology tests are set forth in Table II below.

TABLE I

Spacer Fluid Compositions Tested

Composition Components

| Composition Designation | Water[1], gal/barrel | Hydrous Magnesium Silicate[2], lb/barrel | Silica[3], lb/barrel | Organic Polymer[4], lb/barrel | Dispersant[5], lb/barrel | Weighting Material[6], lb/barrel | Surface Active Agent[7], gal/barrel | Density, lb/gal | Wt. Ratio of Silica to Hydrous Magnesium Silicate |
|---|---|---|---|---|---|---|---|---|---|
| A | 36.8 | — | — | 1.1 | 3.3 | 161 | 0.1 | 11.3 | — |
| B | 36.6 | 5.4 | — | 1.1 | 3.3 | 160 | 0.1 | 11.3 | — |
| C | 38.3 | 10.8 | — | 1.1 | 3.2 | 159 | 0.1 | 11.4 | — |
| D | 36.1 | 16.1 | — | 1.1 | 3.2 | 157 | 0.1 | 11.4 | — |
| E | 35.4 | — | 31.6 | 1.1 | 3.2 | 155 | 0.1 | 11.6 | — |
| F | 35.2 | — | 36.6 | 1.1 | 3.1 | 154 | 0.1 | 11.6 | — |
| G | 35 | — | 41.5 | 1 | 3.1 | 153 | 0.1 | 11.7 | — |
| H | 35.4 | 11.6 | 21 | 1.1 | 3.2 | 155 | 0.1 | 11.6 | 2 |
| I bm | 35.2 | 11.6 | 26.1 | 1 | 3.1 | 154 | 0.1 | 11.6 | 2.5 |
| J | 35.1 | 11.7 | 28.6 | 1 | 3.1 | 153 | 0.1 | 11.7 | 2.75 |
| K | 35 | 11.7 | 31.1 | 1 | 3.1 | 153 | 0.1 | 11.7 | 3 |
| L | 34.8 | 11.7 | 36.1 | 1 | 3.1 | 152 | 0.1 | 11.7 | 3.5 |
| M | 34.6 | 11.8 | 38.6 | 1 | 3.1 | 151 | 0.1 | 11.8 | 3.75 |
| N | 34.5 | 11.8 | 41 | 1 | 3.1 | 151 | 0.1 | 11.8 | 4 |

[1]Fresh Water
[2]Sepiolite
[3]Fumed Silica
[4]Welan Gum
[5]SVTMA dispersant sold under the tradename "NARLEX D-81 ™" by the National Starch Co. of Bridgewater, New Jersey.
[6]Barite
[7]A sugar lipid surfactant in a 50% by weight aqueous concentrate.

TABLE II

Rheology Tests

| Composition Tested | Temp., °F. | Measurement at rpm Indicated, cp. | | | | | | | Plastic Viscosity, cp. | Yield Point, lb/100 ft.[2] | 300/3 Ratio |
|---|---|---|---|---|---|---|---|---|---|---|---|
| | | 300 | 200 | 100 | 60 | 30 | 6 | 3 | | | |
| A | RT[1] | 26.5 | 22 | 16 | 13 | 10 | 6.5 | 5 | 21.2 | 10.9 | 5.3 |
|   | 185 | 20.5 | 17.5 | 14 | 12.5 | 10.5 | 6.5 | 5 | 10.9 | 10.6 | 4.1 |
| B | RT | 31.5 | 25 | 17.5 | 16.5 | 12.5 | 14 | 11 | 20.6 | 11.8 | 2.9 |
|   | 185 | 25 | 22 | 18 | 15.5 | 13 | 9 | 7.5 | 13.3 | 13.4 | 3.3 |
| C | RT | 46 | 37 | 27 | 22 | 18 | 11 | 9 | 31.3 | 16.6 | 5.1 |
|   | 185 | 29 | 25 | 20 | 18 | 15 | 10 | 9 | 15.3 | 15.3 | 3.2 |
| D | RT | 50 | 41 | 29.5 | 24.5 | 20.5 | 13 | 11 | 33.3 | 18.9 | 4.6 |
|   | 185 | 32 | 28 | 21.5 | 19 | 16.5 | 10.5 | 9.5 | 17.6 | 16.3 | 3.4 |
| E | RT | 37 | 30.5 | 22.5 | 19 | 15 | 9 | 7.5 | 24.5 | 14.4 | 4.9 |
|   | 185 | 28 | 24 | 19.5 | 16.5 | 14 | 8.5 | 7.5 | 15.5 | 14.1 | 3.7 |
| F | RT | 40 | 32.5 | 24 | 20 | 16.5 | 10 | 8.5 | 26.2 | 15.5 | 4.7 |
|   | 185 | 28.5 | 25 | 20.5 | 18 | 15 | 10.5 | 8.5 | 14.8 | 15.5 | 3.4 |
| G | RT | 45.5 | 40 | 32 | 26.5 | 20.5 | 13 | 10.5 | 27.8 | 21.3 | 4.3 |
|   | 185 | 31.5 | 27.5 | 22 | 19 | 15.5 | 9.5 | 8 | 17.7 | 15.9 | 3.9 |
| H | RT | 57.5 | 47 | 36 | 30.5 | 24 | 15 | 12.5 | 36.7 | 23.5 | 4.6 |
|   | 190 | 50 | 42 | 34 | 29 | 24.5 | 16.5 | 14 | 28 | 24.5 | 3.6 |
| I | RT | 54.5 | 45.5 | 33.5 | 29 | 24 | 15 | 12 | 34.6 | 22.8 | 4.5 |
|   | 190 | 45.5 | 39.5 | 31.5 | 27 | 22 | 15 | 13 | 25.3 | 22.8 | 3.5 |
| J | RT | 61 | 50.5 | 39 | 33 | 26 | 16 | 13.5 | 38.5 | 25.7 | 4.5 |
|   | 190 | 51 | 44.5 | 37 | 31.5 | 26 | 17.5 | 15 | 27.4 | 27 | 3.4 |
| K | RT | 62 | 52 | 40 | 34 | 27 | 17 | 14 | 36.7 | 26.8 | 4.4 |
|   | 190 | 53 | 46 | 39 | 33.5 | 28 | 19 | 16.5 | 27.1 | 29.2 | 3.2 |
| L | RT | 65.5 | 55.5 | 43 | 36 | 29 | 18 | 15 | 40.6 | 28.8 | 4.4 |
|   | 190 | 53 | 46 | 37.5 | 32.5 | 27.5 | 19 | 17 | 28.1 | 28 | 3.1 |
| M | RT | 70 | 56 | 44.5 | 37 | 29 | 18 | 15 | 45.3 | 28.5 | 4.7 |
|   | 190 | 55.5 | 49 | 40.5 | 35 | 29 | 19.5 | 17.5 | 29.1 | 30.2 | 3.2 |
| N | RT | 72.5 | 60.5 | 48.5 | 38.5 | 30.5 | 19 | 16 | 46.6 | 30 | 4.5 |
|   | 190 | 57 | 49.5 | 39.5 | 34.5 | 29 | 20 | 17.5 | 31 | 29.4 | 3.3 |

[1]RT stands for room temperature.

From Tables I and II above, it can be seen that the aqueous gelled compositions of this invention, i.e., compositions H through N comprised of hydrous magnesium silicate clay, silica and one or more organic polymers have the highest overall viscosity yield and have relatively low 300/3 ratios. The 300/3 ratio indicates shear stress changes over shear rate changes. That is, the lower the slope value, the more constant the shear stress remains over large shear rate changes, and the spacer fluid is less likely to channel in an eccentric annulus. Further, the spacer fluids of the present invention exhibit less temperature thinning at low shear stress rates. i.e., at and below about the 60 rpm level. As shown in Table II, the compositions of the present invention ing organic polymer comprised of welan gum, hydroxyethylcellulose and mixtures of welan gum and hydroxyethylcellulose as shown in Table III below.

The results of rheology tests using the compositions are given in Table IV which is also set forth below.

TABLE III

Spacer Fluid Compositions Containing Various Organic Polymers and Methods

| | | Composition Components | | | | |
|---|---|---|---|---|---|---|
| | Composition | Organic Polymer in Dry Mix | | | | |
| Composition Designation | Density, lb/gal | Dry Mix[1], lb/barrel | Welan Gum % By Weight | HEC, % By Weight | Dispersant[2], lb/barrel | Surfactant[3], gal/barrel |
| A | 15 | 14 | 100 | — | 2 | 0.4 |
| B | 15 | 14 | 85 | 15 | 2 | 0.4 |
| C | 15 | 14 | 50 | 50 | 2 | 0.4 |
| D | 15 | 14 | 25 | 75 | 2 | 0.4 |
| E | 15 | 14 | — | 100 | 2 | 0.4 |

[1]Dry mix was comprised of 72% by weight silica, 24% by weight sepiolite and 4% by weight total organic polymer.
[2]SVTMA dispersant sold under the trade name "NARLEX D-81 ™ " by the National Starch Co.
[3]A sugar lipid surfactant in a 50% by weight aqueous concentrate.

TABLE IV

Rheology Tests

| Composition Tested | Temp., °F. | Measurement at rpm Indicated, cp. | | | | | | | | | | | Plastic Viscosity, cp. | Yield Point, lb/ 100 ft.[2] | 300/3 Ratio |
|---|---|---|---|---|---|---|---|---|---|---|---|---|---|---|---|
| | | 600 | 300 | 200 | 100 | 60 | 30 | 20 | 10 | 6 | 3 | 2 | 1 | | | |
| A | RT[1] | 75 | 46 | 35 | 24 | 19 | 14 | 12 | 9 | 7 | 6 | 5 | 4 | 34.7 | 12.3 | 7.7 |
| | 150 | 54 | 35 | 28 | 20 | 16 | 12 | 10 | 8 | 7 | 5 | 5 | 4 | 24.9 | 11.4 | 7 |
| | 190 | 60 | 40 | 32 | 24 | 19 | 15 | 13 | 11 | 9 | 8 | 7 | 5 | 27 | 14.4 | 5 |
| B | RT | 117 | 79 | 63 | 45 | 36 | 28 | 24 | 19 | 17 | 14 | 13 | 10 | 55.6 | 26.1 | 5.6 |
| | 150 | 86 | 60 | 49 | 36 | 29 | 23 | 20 | 16 | 14 | 11 | 10 | 8 | 40.3 | 22.1 | 5.5 |
| | 190 | 96 | 68 | 57 | 42 | 35 | 27 | 24 | 19 | 16 | 13 | 11 | 9 | 44.3 | 27.0 | 5.2 |
| C | RT | 102 | 65 | 50 | 33 | 25 | 18 | 15 | 11 | 9 | 7 | 6 | 4 | 51.5 | 15.4 | 9.3 |
| | 150 | 69 | 43 | 34 | 23 | 18 | 13 | 11 | 8 | 7 | 5 | 4 | 3 | 32.7 | 11.8 | 8.6 |
| | 190 | 72 | 48 | 38 | 27 | 22 | 17 | 14 | 11 | 9 | 7 | 6 | 5 | 33.7 | 15.8 | 6.9 |
| D | RT | 101 | 64 | 48 | 31 | 23 | 16 | 13 | 9 | 7 | 5 | 4 | 3 | 52.4 | 13 | 12.8 |
| | 150 | 62 | 36 | 27 | 18 | 14 | 10 | 8 | 6 | 4 | 3 | 3 | 2 | 28.2 | 8.5 | 12 |
| | 190 | 64 | 40 | 30 | 21 | 17 | 13 | 11 | 8 | 7 | 5 | 5 | 4 | 29.2 | 11.4 | 8 |
| E | RT | 96 | 60 | 45 | 29 | 20 | 13 | 10 | 7 | 5 | 4 | 3 | 2 | 51.2 | 10.4 | 15 |
| | 150 | 58 | 32 | 23 | 14 | 10 | 7 | 6 | 4 | 3 | 2 | 2 | 1 | 27.6 | 4.8 | 16 |
| | 190 | 57 | 32 | 24 | 16 | 13 | 9 | 8 | 6 | 5 | 4 | 3 | 3 | 24.7 | 7.9 | 8 |

[1]RT stands for room temperature.

designated by the letters H through N which have ratios of silica to hydrous magnesium silicate clay ranging from about 2 to 4 produce shear stress values (viscosities) at the lower shear stress rates that increase as temperature increases. This advantageous behavior is not evident in the spacer fluid compositions A through G which do not include the present invention combination of hydrous magnesium silicate clay and silica with organic polymer. As further shown by Tables I and II, an optimum weight ratio of silica to hydrous magnesium silicate clay is in the range of from about 2.75 to 3.5.

EXAMPLE 2

The tests described in Example 1 were repeated using spacer fluid compositions of the present invention contain- From Tables III and IV it can be seen that a spacer fluid of the present invention containing about a 5.7:1 by weight ratio of welan gum to hydroxyethylcellulose (composition B) yields the highest viscosity and has the lowest 300/3 ratio. Thus, the data shows that when a weight ratio of about 5.7:1 welan gum to hydroxyethylcellulose is used in the spacer fluids of this invention a synergistic rheology enhancement results thereby requiring less polymer to yield a specific viscosity.

EXAMPLE 3

The tests described in Example 1 were again repeated using spacer fluid compositions of the present invention containing equal and greater ratios of hydrous magnesium silicate clay to silica. The tested compositions are given in Table V below and the results of rheology tests using the compositions are given in Table VI below.

TABLE V

Spacer Fluid Compositions Containing Various Ratios Hydrous Magnesium Silicate Clay to Silica

| Composition Designation | Composition Density, lb/gal | Dry Mix, lb/barrel | Hydrous Magnesium Silicate Clay[2], % By Weight Of Composition | Silica[3], % By Weight Of Composition | Organic Polymer[4], % By Weight Of Composition | Salt[5], % By Weight Of Water In Composition |
|---|---|---|---|---|---|---|
| A | 15 | 18.4 | 48.9 | 48.9 | 2.2 | — |
| B | 15 | 18.4 | 73.4 | 24.4 | 2.2 | — |
| C | 15 | 18.4 | 48.9 | 48.9 | 2.2 | 3 |
| D | 15 | 18.4 | 73.4 | 24.4 | 2.2 | 3 |

[1]Dry mix was added to fresh water to form spacer fluid composition of indicated density.
[2]Sepiolite
[3]Fumed Silica
[4]Welan Gum
[5]Ammonium Chloride

TABLE VI

Rheology Tests

| Composition Tested | Temp., °F. | Measurement at rpm Indicated, cp. | | | | | | | | | | | | Plastic Viscosity, cp. | Yield Point, lb/ 100 ft.[2] | 300/3 Ratio |
|---|---|---|---|---|---|---|---|---|---|---|---|---|---|---|---|---|
| | | 600 | 300 | 200 | 100 | 60 | 30 | 20 | 10 | 6 | 3 | 2 | 1 | | | |
| A | RT[1] | 102 | 68 | 54 | 37 | 29 | 21 | 17 | 13 | 11 | 8 | 8 | 6 | 51.1 | 19.4 | 8.5 |
| | 150 | 60 | 39 | 31 | 22 | 17 | 13 | 11 | 19 | 8 | 7 | 6 | 5 | 28.4 | 12 | 5.6 |
| | 190 | 75 | 51 | 40 | 29 | 23 | 18 | 16 | 14 | 12 | 11 | 10 | 8 | 35.8 | 16.7 | 4.6 |
| B | RT | 116 | 79 | 64 | 45 | 35 | 27 | 23 | 18 | 15 | 13 | 11 | 10 | 57.1 | 25.2 | 6.1 |
| | 150 | 75 | 51 | 43 | 32 | 26 | 20 | 18 | 15 | 13 | 11 | 10 | 9 | 33.5 | 20.2 | 4.6 |
| | 190 | 79 | 55 | 41 | 35 | 29 | 24 | 21 | 18 | 16 | 14 | 13 | 11 | 32 | 23.5 | 3.9 |
| C | RT | 103 | 71 | 58 | 42 | 34 | 27 | 23 | 19 | 17 | 15 | 14 | 12 | 48.1 | 25.8 | 4.7 |
| | 150 | 75 | 53 | 44 | 34 | 29 | 25 | 23 | 20 | 19 | 17 | 16 | 12 | 30.7 | 24.3 | 3.1 |
| | 190 | 75 | 57 | 48 | 38 | 34 | 29 | 27 | 26 | 24 | 21 | 18 | 13 | 22.2 | 26.6 | 2.7 |
| D | RT | 123 | 89 | 73 | 55 | 46 | 38 | 33 | 29 | 27 | 24 | 23 | 20 | 55.6 | 36.8 | 3.7 |
| | 150 | 84 | 62 | 53 | 42 | 36 | 31 | 29 | 26 | 25 | 24 | 22 | 17 | 33.8 | 31.1 | 2.6 |
| | 190 | 82 | 62 | 54 | 42 | 39 | 35 | 33 | 30 | 29 | 27 | 23 | 17 | 30.2 | 34.6 | 2.3 |

[1]RT stands for room temperature.

From Tables V and VI it can be seen that compositions B and D each containing a weight ratio of hydrous magnesium silicate clay to silica of 3:1 had enhanced rheology properties and low 300/3 ratios as compared to compositions A and C, respectively, which included equal weight ratios of hydrous magnesium silicate clay to silica. Thus, a synergistic rheology enhancement results when the weight ratio of hydrous magnesium silicate clay to silica in a spacer fluid composition of this invention is about 3:1. As previously shown in Tables I and II above, a similar synergistic rheology enhancement occurs when the weight ratio of hydrous magnesium silicate clay to silica is about 1:3.

Thus, the present invention is well adapted to carry out the objects and attain the ends and advantages mentioned as well as those inherent therein. While numerous changes may be made by those skilled in the art, such changes are encompassed within the spirit of this invention as defined by the appended claims.

What is claimed is:

1. A composition for forming an aqueous well completion spacer fluid comprising:

a hydrous magnesium silicate clay selected from the group consisting of sepiolite and attapulgite present in an amount in the range of from about 15% to about 85% by weight of said composition;

silica present in an amount in the range of from about 15% to about 85% by weight of said composition; and an organic polymer selected from the group consisting of whelan gum, xanthan gum, galactomannan gums, succinoglycan gums, scleroglucan gums and cellulose and its derivatives present in an amount in the range of from about 0.5% to about 10% by weight of said composition.

2. The composition of claim 1 wherein said clay is sepiolite present in an amount of about 24% by weight of said composition, said silica is fumed silica present in an amount of about 74% by weight of said composition and said organic polymer is about 3:1 to about 9:1 by weight mixture of welan gum and hydroxyethylcellulose present in an amount of about 2% by weight of said composition.

3. The composition of claim 2 wherein said organic polymer is about 3:1 by weight mixture of welan gum and hydroxyethylcellulose.

4. The composition of claim 1 wherein said clay is sepiolite present in an amount of about 74% by weight of said composition, said silica is fumed silica present in an amount of about 24% by weight of said composition and said organic polymer is about 3:1 to about 9:1 by weight mixture of welan gum and hydroxyethylcellulose in an amount of about 2% by weight of the composition.

5. The composition of claim 4 wherein said organic polymer is about 3:1 by weight mixture of welan gum and hydroxyethylcellulose.

6. A well completion spacer fluid comprising:

water;

a hydrous magnesium silicate clay selected from the group consisting of sepiolite and attapulgite present in said spacer fluid in an amount in the range of from about 0.1% to about 17% by weight of water therein;

fumed silica present in said spacer fluid in an amount in the range of from about 0.1% to about 17% by weight of water therein; and an organic polymer selected from the group consisting of whelan gum, xanthan gum, galactomannan gums, succinoglycan gums, scleroglucan gums and cellulose and its derivatives present in said spacer fluid in an amount in the range of from about 0.05% to about 2.5% by weight of water therein.

7. The spacer fluid of claim 6 which further comprises a weighting material.

8. The spacer fluid of claim 7 wherein said weighting material is selected from the group consisting of barite, hematite, manganese tetraoxide and calcium carbonate.

9. The spacer fluid of claim 6 which further comprises a dispersing agent.

10. The spacer fluid of claim 9 wherein said dispersing agent is selected from the group consisting of sulphonated styrene maleic anhydride copolymer, sulfonated vinyltoluene maleic anhydride copolymer, sodium naphthalene sulfonate condensed with formaldehyde, sulphonated acetone condensed with formaldehyde, lignosulphonates and interpolymers of acrylic acid, allyloxybenzene sulfonate, allyl sulfonate and non-ionic monomers.

11. The spacer fluid of claim 6 which further comprises a water-wetting surfactant.

12. The spacer fluid of claim 11 wherein said water-wetting surfactant is selected from the group consisting of nonylphenol ethoxylates, alcohol ethoxylates and sugar lipids.

13. A well cement/drilling fluid spacer fluid comprising:

water;

sepiolite clay present in an amount in the range of from about 0.5% to about 10% by weight of water;

fumed silica present in an amount in the range of from about 0.5% to about 10% by weight of water;

about a 3:1 by weight mixture of welan gum and hydroxyethylcellulose present in an amount in the range of from about 0.05% to about 1.2% by weight of water; and barite present in an amount sufficient to increase the density of said spacer fluid to a level in the range of from about 9 pounds to about 24 pounds per gallon of spacer fluid.

14. The spacer fluid of claim 13 which further comprises a dispersing agent selected from the group consisting of sulphonated styrene maleic anhydride copolymer, sulfonated vinyltoluene maleic anhydride copolymer, sodium naphthalene sulfonate condensed with formaldehyde, sulphonated acetone condensed with formaldehyde, lignosulphonates and interpolymers of acrylic acid, allyloxybenzene sulfonate allyl sulfonate and non-ionic monomers present in an amount in the range of from about 0.5% to about 3% by weight of water in said spacer fluid.

15. The spacer fluid of claim 13 which further comprises a water-wetting surfactant selected from the group consisting of nonylphenol ethoxylates, alcohol ethoxylates and sugar lipids present in an amount which replaces up to about 20% of said water.

16. In a method of displacing a first fluid with an incompatible second fluid in a well utilizing a spacer fluid to separate the first fluid from the second fluid and to remove the first fluid from the walls of the well, the improvement comprising using a spacer fluid comprised of water, a hydrous magnesium silicate clay selected from the group consisting of sepiolite and attapulgite, silica, and an organic polymer selected from the group consisting of welan gum, xanthan gum, galactomannan gums, succinoglycan gums, scleroglucan gums and cellulose and its derivatives.

17. The method of claim 16 wherein said first fluid is a well drilling fluid and said second fluid is a hydraulic cement slurry.

18. The method of claim 16 wherein said clay is sepiolite present in said spacer fluid in an amount in the range of from about 0.5% to about 10% by weight of water therein, said silica is fumed silica present in an amount in the range of from about 0.5% to about 10% by weight of water and said polymer is about 3:1 to about 9:1 by weight mixture of welan gum and hydroxyethylcellulose present in an amount in the range of from about 0.05% to about 1.2% by weight of water.

19. The composition of claim 18 wherein said organic polymer is about 3:1 by weight mixture of welan gum and hydroxyethylcellulose.

20. The method of claim 18 wherein said spacer fluid further comprises a weighting material selected from the group consisting of barite, hematite, manganese tetraoxide and calcium carbonate.

21. The method of claim 20 wherein said spacer fluid further comprises a dispersant selected from the group consisting of sulphonated styrene maleic anhydride copolymer, sulfonated vinyltoluene maleic anhydride copolymer, sodium naphthalene sulfonate condensed with formaldehyde, sulphonated acetone condensed with formaldehyde, lignosulphonates and interpolymers of acrylic acid, allyloxybenzene sulfonate, allyl sulfonate and non-ionic monomers.

22. The method of claim 21 wherein said spacer fluid further comprises a water wetting surfactant selected from the group consisting of nonylphenol ethoxylates, alcohol ethoxylates and sugar lipids.

* * * * *